United States Patent
Gomach

(10) Patent No.: US 10,059,889 B2
(45) Date of Patent: Aug. 28, 2018

(54) OXIDATION PROCESS

(71) Applicant: MERICHEM COMPANY, Houston, TX (US)

(72) Inventor: Jeffrey Bruce Gomach, Galveston, TX (US)

(73) Assignee: MERICHEM COMPANY, Houston, TX (US)

( * ) Notice: Subject to any disclaimer, the term of this patent is extended or adjusted under 35 U.S.C. 154(b) by 95 days.

(21) Appl. No.: 15/189,154

(22) Filed: Jun. 22, 2016

(65) Prior Publication Data

US 2017/0369790 A1    Dec. 28, 2017

(51) Int. Cl.
| | |
|---|---|
| C10G 27/10 | (2006.01) |
| B01J 19/24 | (2006.01) |
| B01J 19/32 | (2006.01) |
| C10G 27/04 | (2006.01) |
| C10G 27/06 | (2006.01) |
| C10G 19/02 | (2006.01) |

(52) U.S. Cl.
CPC ............ *C10G 27/10* (2013.01); *B01J 19/242* (2013.01); *B01J 19/32* (2013.01); *C10G 19/02* (2013.01); *C10G 27/04* (2013.01); *C10G 27/06* (2013.01); *B01J 2219/1943* (2013.01); *B01J 2219/24* (2013.01); *C10G 2300/202* (2013.01); *C10G 2300/4056* (2013.01); *C10G 2300/4081* (2013.01)

(58) Field of Classification Search
CPC ...................................................... C10G 27/10
See application file for complete search history.

(56) References Cited

U.S. PATENT DOCUMENTS

| | | |
|---|---|---|
| 3,758,404 A | 9/1973 | Clonts |
| 3,977,829 A | 8/1976 | Clonts |
| 3,992,156 A | 11/1976 | Clonts |
| 5,935,422 A | 8/1999 | Zinnen |
| 7,063,732 B2 | 6/2006 | Katikaneni et al. |
| 7,093,433 B2 | 8/2006 | Belluschi |
| 7,148,389 B2 | 12/2006 | Yang et al. |
| 2011/0163008 A1* | 7/2011 | Zhang .................. C10G 17/00 208/204 |

* cited by examiner

*Primary Examiner* — Randy Boyer
(74) *Attorney, Agent, or Firm* — McDonnell Boehnen Hulbert & Berghoff LLP

(57) ABSTRACT

A process for the removal of residual sulfur compounds from rich liquid caustic is disclosed where a single column containing two reaction zones catalytically oxidizes mercaptans to disulfide oils. The second reaction zone utilizes a bundle of vertical hanging fibers and is maintained as a gas continuous phase comprising from about 20% to about 100% by volume vapor. This process is especially useful as part of a hydrocarbon desulfurization process flow scheme.

8 Claims, 3 Drawing Sheets

OXIDATION PROCESS

FIELD OF INVENTION

My invention relates generally to an improved process for the oxidation of mercaptans, specifically the removal of sulfur compounds from liquid caustic streams. More specifically, my invention concerns a process for treating rich caustic by catalytically oxidizing mercaptans to disulfide oils using three phase oxidation within a single column or vessel containing vertical hanging fibers to produce a regenerated caustic stream that can be reused in a hydrocarbon desulfurization process. My invention can also be integrated as part of a retrofitting into existing processes for removing sulfur contaminants from hydrocarbons, thus eliminating costly equipment and conserving space.

BACKGROUND

The removal of sulfur contaminants, specifically mercaptans, from hydrocarbon streams using caustic is known. Likewise, the oxidation of these mercaptans to disulfides by contacting the rich caustic stream with a catalyst in the presence of oxygen followed by separation of the disulfides from the treated caustic is also known. For economic reasons the treatment of spent caustic and subsequent recycle of the regenerated caustic is important. Likewise, reducing the need for excess equipment and the resultant saving of land space are continuing desirable goals.

Typically, liquid-liquid contactors are employed for the caustic treatment of hydrocarbons and in some cases fiber-film contactors as described in U.S. Pat. Nos. 3,758,404; 3,977,829 and 3,992,156, all of which are incorporated herein by reference. Such processes are typically followed by a caustic regenerator process involving an oxidation reactor followed by one or more separation vessels. A typical process flow scheme for treating a hydrocarbon involves a first caustic treatment using at least one liquid-liquid contactor to extract the sulfur contaminants, typically mercaptans, from the hydrocarbon feed, which generates a "spent" caustic solution that is rich in mercaptan or so called "rich caustic," separating the treated hydrocarbons in the contactor, oxidizing the rich caustic to convert mercaptans to disulfides (typically referred to as disulfide oils ("DSO")) which generates an "oxidized" caustic solution, and then using a gravity separator to separate the DSO from the oxidized caustic solution. In some instances, a granular coal bed is used in conjunction with the gravity settling device as a coalescer to further assist in the separation of the DSO from the oxidized caustic. Once the DSO is removed, the regenerated caustic can be further processed and then recycled, where it is mixed with fresh make-up caustic and used in the liquid-liquid contactors to treat the hydrocarbon feed. More typically, a further polishing processing is required in order to reduce the unconverted mercaptans and residual DSO to preferably below 5 weight ppm as sulfur. The presence of substantial mercaptans in regenerated caustic is undesirable because it can cause a loss of extraction efficiency and presents a potential for downstream formation of disulfides. The presence of substantial DSO in regenerated caustic leads to undesirable re-entry or back extraction of DSO into hydrocarbon during the hydrocarbon-caustic extraction process.

Solvent washing is a known technology and is often used as a polishing step to extract residual DSO from caustic. However, due to mass transfer and equilibrium limitations, these solvent washing unit operations usually require multiple stages with higher capital and operating costs. Besides, solvent washing is ineffective to remove mercaptans from caustic. Similarly, centrifugal process and membrane separation suffer from high costs and inability to achieve less than 5 weight ppm sulfur.

Adsorptive polishing is another technology that can be used. Adsorptive desulfurization has been applied to remove sulfur compounds from hydrocarbons such as gasoline and diesel. Examples are shown in U.S. Pat. Nos. 7,093,433; 7,148,389; 7,063,732; and 5,935,422. However, the adsorbents reported in these patents and in other literature are ineffective in caustic media.

Therefore, there remains a need to develop a technology that can economically removes both disulfides and mercaptans from caustic to achieve less than 15 weight ppm sulfur, preferably less than 7.5 ppm.

My process uses a single column or vessel to oxidize and remove both insoluble disulfides and mercaptans from rich caustic feeds. Further, my process is extremely economical compared to traditional methods for removing residual sulfur compounds from caustic solutions by minimizing both capital and operating costs. These and other advantages will become evident from the following more detailed description of the invention.

SUMMARY

As mentioned, my invention relates to processes for removing sulfur compounds in a rich caustic feed using a single column employing a three phase catalytic oxidation reaction. My invention produces a regenerated caustic stream that contains less than 15 ppm by weight, preferably less than 7.5 ppm by weight (as sulfur) of sulfur compounds.

Although it is known to use oxidation as a means to convert mercaptans to DSO, such known processes typically do not convert all the mercaptans to DSO, thus leaving up to 5% or more of the mercaptans in the oxidation reaction product stream. Prior to this invention, the unconverted mercaptans are always left unconverted in the regenerated caustic, which adversely impacts the subsequent caustic-hydrocarbon extraction process. What has not been realized before my invention is that those residual mercaptans can be converted to DSO, along with the residual DSO not removed in the separation process that normally follows oxidation of rich caustic streams, all in single column using at least two reaction zones and employing vertical hanging fibers within the second reaction zone operated as a gas continuous phase comprising from about 20% to about 100% by volume vapor. My process can easily integrate into new and existing caustic regeneration process flow schemes (e.g., through retrofitting) where a rich caustic stream is generated when sulfur contaminants from the treatment of hydrocarbon streams are contacted with lean caustic (fresh and/or recycled).

As used herein, disulfide oils or DSO is meant to include a mixture of possible disulfides, including dimethyl disulfide, diethyl disulfide, methyl ethyl disulfide and higher disulfides. Likewise, the term mercaptan is meant to include any of a class of organosulfur compounds that are similar to the alcohol and phenol, but containing a sulfur atom in place of the oxygen atom, and specifically includes mercaptides. Compounds containing —SH as the principal group directly attached to carbon are named "thiols."

One aspect of my invention involves a process for removing residual sulfur compounds from a caustic feed stream, where a liquid stream containing mercaptans and a liquid catalyst is provided to a top portion of a column containing a bundle of vertical hanging fibers. An oxygen containing gas is mixed with the liquid stream to form an admixture prior to contacting the admixture with the vertical hanging fibers. The admixture is then directed to flow down the fibers and to enter a gas continuous phase reaction zone comprising from about 20% to about 100% by volume vapor. In the continuous phase reaction zone the mercaptans are oxidized to disulfide oils as the admixture flows down the fibers in the reaction zone. The produced DSO is collected, separated, and removed from the column.

In another aspect of my invention there is a method for regenerating a caustic solution comprising a rich caustic liquid containing mercaptans that is mixed with a liquid catalyst to form a liquid caustic catalyst admixture. This liquid caustic catalyst admixture is then directed into a bottom section of a vertical column configured to cause the liquid caustic catalyst admixture to flow upward inside the column where an oxygen containing gas is injected or sparged into the liquid caustic catalyst admixture to form a gas liquid mix that flows upward inside the column entering a first reaction zone. The first reaction zone may comprise a bed of supported packing material as a contacting surface for the gas liquid mix. In this first reaction zone the mercaptans are oxidized to disulfide oil forming an oxidized gas liquid mix, which is then directed into a conduit positioned between a top tray and a bottom tray such that a liquid mix of disulfide oil and caustic exits the conduit onto a top surface of the top tray that is fixedly attached to an upper section of the column. The interior portion of the upper section of the column above the top tray is preferably maintained as a nonexplosive environment, which can be achieved by introducing fuel gas or inert gas into the upper section.

The liquid mix of disulfide oil and caustic is directed into a shroud connected to a lower side of the top tray where the liquid mix of disulfide oil and caustic contacts a bundle of vertical hanging fibers such that the liquid mix of disulfide oil and caustic flows down individual fibers in the bundle and into a second reaction zone. The second reaction zone is maintained and operated as a gas continuous phase comprising from about 20% to about 100% by volume vapor causing the mercaptans in the liquid mix of disulfide oil and caustic to oxidize while the liquid mix of disulfide oil and caustic flows down the fibers in the second reaction zone to form a regenerated caustic and disulfide oil admixture. The regenerated caustic and disulfide oil admixture is collected on the bottom tray with a residence time sufficient to allow separation of the disulfide oil from the regenerated caustic. Separate continuous streams of disulfide oil and a stream of regenerated caustic are removed from the column.

The oxidation reactor of my invention may also comprise a column having a vertical axis, an upper section and a lower section, where a first reaction zone is positioned above the lower section. The first reaction zone may comprise a bed of supported packing material to provide increased surface area for gas-liquid contacting. A second reaction zone is located above the first reaction zone and below the upper section and is defined by a top tray and a bottom tray, where both trays are fixedly attached to the column and have upper and lower surfaces. A fluid conduit is positioned between the top and bottom trays that is configured to provide fluid communication between the lower surface of the bottom tray and the upper surface of the top tray. This allows an up flow of fluid, i.e., an admixture of gas and liquid, to move from the first reaction zone below the bottom tray to the upper section of the column and above the top tray. A shroud is positioned such that it extends vertically downward from the lower surface of the top tray. The shroud provides fluid communication between the upper surface of top tray and the second reaction zone. A plurality of hanging fibers is positioned parallel to the vertical axis of the column and are partially contained within the shroud such that the hanging fibers extend down below a lower end of the shroud into the second reaction zone.

The oxidation reactor of my invention may also have a modified or extended shroud comprising a disengagement device that defines a coalescing zone having one or more openings that are configured to allow liquid within the shroud to exit the shroud through the one or more openings following a flow path that is not parallel to the vertical axis.

Yet another aspect of my process involves methods of retrofitting an existing and pre-used oxidation reactors where the internals of an existing pre-used oxidation reactor is inventoried to determine the presence of existing components. The internal dimensions of the reactor are determined and then new components are installed, or the existing components in the reactor are modified, such that the retrofitted oxidation reactor comprises a top tray and a bottom tray located in an upper section of the reactor, where both trays have upper and lower surfaces with a conduit positioned between the top and bottom trays. This conduit is configured to provide fluid communication between the lower surface of the bottom tray and the upper surface of the top tray. The retrofitted vessel/reactor will also contain a shroud is positioned so that it extends vertically downward from the lower surface of the top tray and provides fluid communication between the upper surface of top tray and the top surface of the bottom tray. Inside the shroud are positioned a plurality of hanging fibers positioned parallel with the vertical axis of the reactor that extend down below a lower end of the shroud and above the top surface of the top tray.

The regenerated or lean caustic stream removed from the column has less than 15 weight ppm, preferably less than 7.5 weight ppm (as sulfur) of sulfur compounds. Operating temperatures of the column range from about 50 to about 212° F., preferably from about 75 to about 175° F., and most preferably from about 75 to about 150° F. My process can operate at ambient pressure or at the operating pressures typically encountered in caustic regeneration process flow schemes.

The liquid catalyst composition used in the oxidation process is preferably a liquid chelated polyvalent metal catalyst solution. Polyvalent catalysts include, but are not limited to, metal phthalocyanines, wherein the metal cation is selected from the group consisting of vanadium (V), manganese (Mn), iron (Fe), cobalt (Co), nickel (Ni), copper (Cu), zinc (Zn), ruthenium (Ru), rodium (Rh), palladium (Pd), silver (Ag) etc. Catalyst concentration is from about 10 to about 10,000 ppm, preferably from about 20 to about 4000 ppm.

The liquid catalyst composition used in my oxidation process may also include one or more alcohols that have atmospheric boiling points of from 65° C. to 225° C. These alcohols include, but are not limited to, methanol, ethanol, 1-propanol, 2-propanol, 2-methyl-1 propanol, 2-methyl-2-butanol, cyclohexanol, phenol, cresols, xylenols, hydroquinone, resorcinol, catechol, benzyl alcohol, ethylene glycol, propylene glycol, and other alkyl phenols. When mixed with one or more alkali metal hydroxides, alkali metal salts of the alcohol are formed, preferably in a concentration of from about 5 to about 40 wt %, most preferably from about 10 to about 35 wt %. One type of preferred alcohol is an aromatic alcohol, which are compounds represented by a general formula of aryl-OH. The aryl can be phenyl, thiophenyl, indolyl, tolyl, xylyl, and alike. Preferred aromatic alcohols include phenol, cresols, xylenols, methyl ethyl phenols, ethyl phenols, trimethyl phenols, naphthols, alkylnaphthols, thiophenols, alkylthiophenols, and similar phenolics. Non-aromatic alcohols can be primary, secondary or tertiary alcohols, including methanol, ethanol, n-propanol, iso-propanol, cyclohexanol, 2-methyl-1-propanol, and 2-methyl-2-butanol. A mixture of different alcohols can also be used. The preferred alcohols have an atmospheric boiling point of from about 80° C. to about 215° C. The preferred alkali metal salts of alcohol include, but are not limited to, potassium cyclohexoxide, potassium iso-propoxide, dipotassium propylene glycoxide, potassium cresylates as well as their sodium counterparts, and mixtures thereof.

Further ingredients of the catalyst can include one or more carboxylic acids are included. Such acids include, but are not limited to, fatty acids, naphthenic acids, amino acids, keto acids, alpha hydroxy acids, dicarboxylic acids, and tricarboxylic acids. These acids also react with the alkali metal hydroxides to produce their alkali metal salts in concentrations from about 0 to about 40 wt %, preferably from about 5 to about 25 wt %. In general, the carboxylic acids can include alkanoic acids and naphthenic acids, where the alkanoic acids are represented by R—COOH, where R is a hydrogen or an alkyl group ranging from CH3- (i.e. acetic acid) to CH3(CH2)18- (i.e. arachidic acid). Naphthenic acids are a mixture of multiple cyclopentyl and cyclohexyl carboxylic acids with their main fractions preferably having a carbon backbone of 9 to 20 carbons. A mixture of multiple carboxylic acid compounds can also be used as part of the treatment solution.

Yet a further ingredient of the liquid catalyst formulation can be an alkali metal hydroxide selected from lithium hydroxide (LiOH), sodium hydroxide (NaOH), potassium hydroxide (KOH), rubidium hydroxide (RbOH), and cesium hydroxide (CsOH). More than one alkali metal hydroxides can be used. The alkali metal hydroxide is present at a concentration that is more than sufficient to ensure all alcohols and carboxylic acids to form their corresponding alkali metal salts. Sodium hydroxide and especially potassium hydroxide are preferred.

These and other objects will become more apparent from the detailed description of the preferred embodiment contained below.

DETAILED DESCRIPTION

As stated, my invention concerns a novel process for converting mercaptans to disulfide oils (DSO) using an oxidation reaction. This process can be integrated into a hydrocarbon desulfurization process as part of the caustic regeneration step that is designed to remove the sulfur compounds from rich caustic that were extracted from the rich hydrocarbon feed. More specifically, my invention eliminates the need for multiple excess vessels and additional unit operations by using a single column or other vessel to perform both the oxidation of mercaptans and the separation of the DSO formed from the treated caustic. The treated caustic preferably has less than 7.5 ppm by weight sulfur compounds and is suitable for recycle back to a hydrocarbon desulfurization process. My process utilizes a reaction zone maintained as a gas continuous phase comprising from about 20% to about 100% by volume vapor and utilizing vertically hanging fibers.

Figure 1:
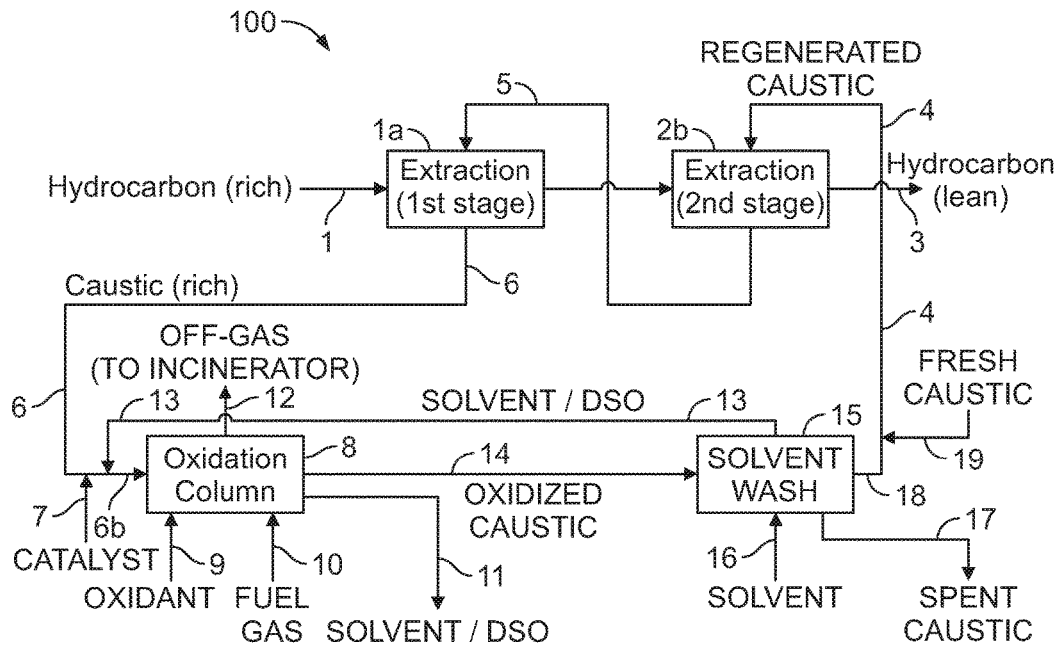
FIG. 1 schematically illustrates one possible application of my improved oxidation process as part of a hydrocarbon desulfurization process.

FIG. 1 illustrates one embodiment of my invention integrated into a hydrocarbon desulfurization process 100. However, my invention could be a stand-alone oxidation process that receives rich caustic form a number of varying sources. FIG. 1 shows a rich hydrocarbon feed 1, being treated in a counter current multiple stage extraction process. Typically, the rich hydrocarbon 1 is contaminated with mercaptan compounds, for example methyl and ethyl mercaptide. Lean or regenerated caustic 4 is fed to a last stage 2b where the lean caustic extracts the mercaptans from the hydrocarbons entering stage 2b after first being treated in stage 2a. The caustic is removed from the second stage as stream 5 where it contacts the incoming feed of rich hydrocarbons 1 in the first stage 2a. A rich or spent caustic is removed from stage 2a and the treated lean hydrocarbon is removed as desulfurized hydrocarbon 3 for further processing, for example, in an alkylation unit. The desulfurized hydrocarbon 3 is now substantially sulfur free, meaning the hydrocarbon has a sulfur level of <150 ppm total sulfur, preferably <30 ppm total sulfur and more preferably <10 ppm total sulfur.

The specific design of the hydrocarbon/caustic treatment section is not critical to my invention; however, a preferred design includes staged contactors operating in a counter-current configuration as schematically illustrated in FIG. 1, with a most preferred contactor configuration using fiber film liquid-liquid contactors to assist in the mass transfer of the mercaptans from the hydrocarbons into the caustic treatment solution. These as well as other contactor configurations are known to those skilled in the art. The caustic 4 can be any type known to the art of sweetening hydrocarbons, including solutions comprising NaOH, KOH, Ca(OH)2, Na2CO3, ammonia, extraction of organic acids, or mixtures thereof. Preferably, the caustic comprises aqueous potassium hydroxide solutions and aqueous sodium hydroxide solutions having concentration of from about 1% to about 50%, more preferably from about 3% to about 25%, still more preferably from about 5% to about 20%, by weight alkali hydroxide.

The rich caustic 6 removed from the hydrocarbon desulfurization process is mixed with a liquid catalyst 7, preferably as a fresh make-up stream of the liquid catalyst in order to supplement the catalyst that is lost through degradation as the catalyst moves with the caustic throughout process 100. A preferred liquid catalyst is made by adding metal phthalocyanine catalyst to an aqueous solution of alkali metal hydroxide. Another preferred liquid catalyst solution further contains an alcohol and at least one carboxylic acid, such as naphthenic or ethylhexanoic acid.

In one alternative embodiment of my invention a small volume solvent stream 13 can be added to the rich caustic 6. Preferably, this solvent stream 13 is obtained from a downstream solvent washing step 15 and may contain a small amount of DSO. The solvent stream can be mixed with the rich caustic prior to entering the single oxidizer column 8 or it could injected as a separate stream into the bottom of the single oxidizer column 8. The solvent can be any light hydrocarbon or mixture of light hydrocarbons that will assist in the separation of the DSO from the caustic solution after oxidation of the mercaptans, however, preferred solvents included naphtha and kerosene. Although the exact mechanism of how the solvent improves the separation of DSO from the oxidized caustic is not specifically known, one theory is that the solvent has a much higher solubility for DSO than does caustic, with their differential of solubility providing an extractive driving force. This effect is further magnified because the single oxidizer column, as will be explained in more detail below, utilizes fiber-film technology that provides higher interfacial surface area than other forms of contacting devices. The amount of solvent, based on the volume percent of the rich caustic feed, introduced into the oxidizer, either with the rich caustic or separately, is not especially critical to my invention as long as a minimum amount is used so as to maximize separation performance within the single column oxidizer 8. As mentioned only a small volume of solvent is needed, with a preferred range of minimum solvent injection from about 0.1 vol % to about 10.0 vol %, preferably from about 0.5 vol. % to about 5.0 vol. %, of the rich caustic feed 6.

In addition to the rich caustic, the liquid catalyst and solvent that are fed to the single column oxidizer 8, an oxidant 9, such as air, hydrogen peroxide, or other oxygen containing gas(es), is also introduced to the single column oxidizer 8. The amount of oxidant added to the oxidizer is sufficient to achieve 90+% oxidation and conversion of the mercaptans originally present in the rich hydrocarbon to disulfide compounds, most preferably 99+% oxidation. A second, optional, oxidant feed 80 (see FIG. 2) may be added to oxidizer 8 in order to maintain a second reaction zone in a gas continuous phase comprising from about 20% to about 100% by volume vapor.

A preferred range of operating conditions for the single column oxidizer 8 includes a temperature of from about 75° F. to about 200° F. and a caustic flow rate of as high as 60 LHSV, but preferably from about 100° F. to about 150° F. and less than 5 LHSV. The operating pressure of my process can be from atmospheric to about 100 psig.

The oxidized or lean caustic 14 removed from the the single column oxidizer 8 can be subsequently treated in a solvent washing process 15 where solvent 16 is contacted with the lean caustic 14, preferably in a counter current flow configuration to remove any residual DSO that was not separated in the single column oxidizer 8. A fully regenerated caustic 18 is removed from the the solvent washing step 15. An amount of make-up fresh caustic 19 can be added before the generated caustic 4 is recycled back to the extraction stages 2a & 2b.

Figure 2:
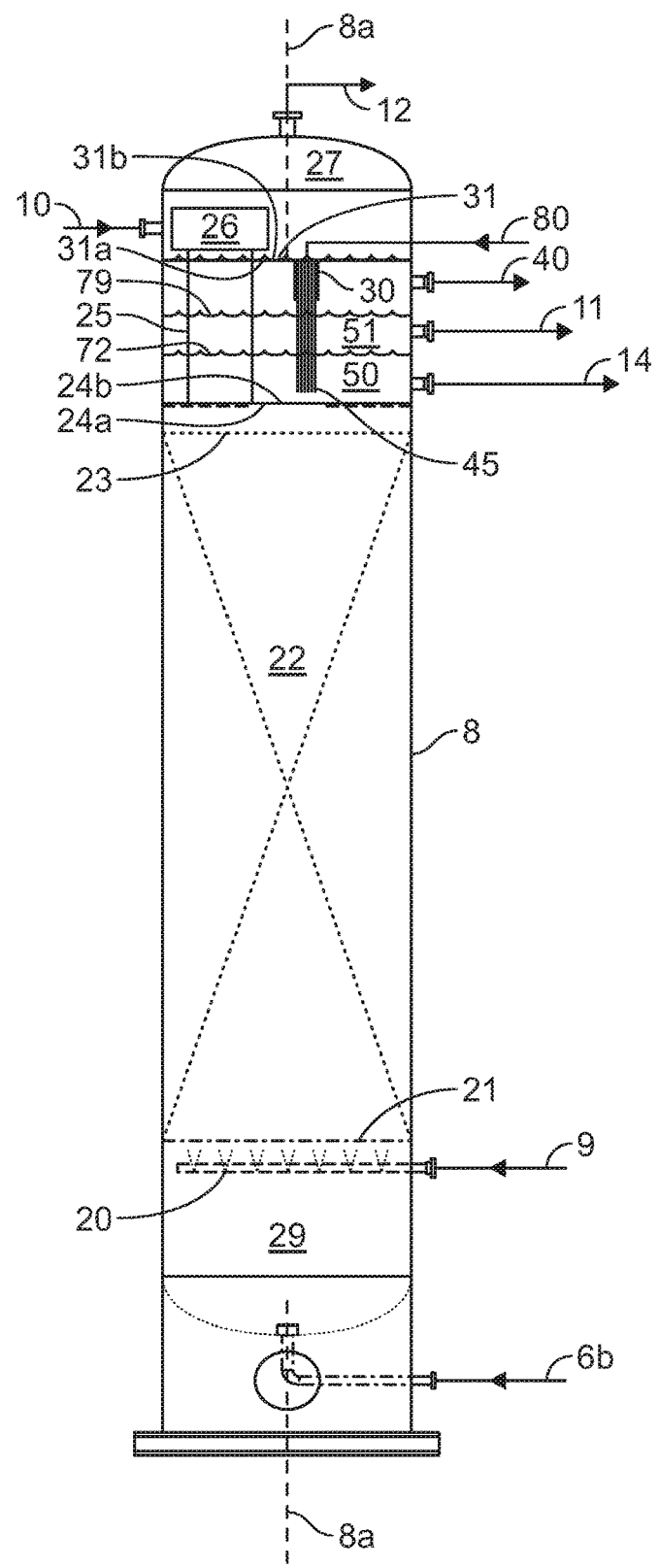
FIG. 2 is a cross-sectional view of one embodiment of my oxidation column.

Turning next to the specifics of the single column oxidizer 8, FIG. 2 schematically illustrates one embodiment of my invention where catalytic oxidation of the mercaptans to DSO along with separation of the oxidized caustic occurs in a single vessel. In other words, no other vessels or equipment are needed to process a rich caustic streaming containing up to 50,000 ppm total sulfur compounds and produce an oxidized caustic stream having less than 5 ppm mercaptans and less than 400 ppm total sulfur compounds. The oxidizer 8 is preferably a vertical column having a vertical axis 8a. Column 8 has a lower section 29 where the liquid caustic catalyst admixture 6b is introduced. As mentioned this liquid admixture 6b can comprise rich caustic, liquid catalyst, and solvent. The liquid admixture 6b is directed up flow within column 8 where it is mixed with oxidant 9, preferably air, that is introduced into the lower section 29 through one or more spargers 20. The rate of oxidant flow is such that the oxidant is adequately distributed throughout the column's first reaction zone 22. The resulting gas liquid mix flows upward in column in column 8 and enters a first reaction zone 22. This reaction zone can be filled with random packing material such as balls, rings or saddles, structured packing such as corrugated plates, knitted fibers, or hanging fibers supported as a bed of solids between optional bed supports 21 and 23. The packing material provides a high surface area for improved gas/liquid contacting. Oxidation of the mercaptans begins to occur in the first reaction zone 22 as the gas liquid mix moves upward through column 8.

As the gas liquid mix exits the first reaction zone 22 it is directed to and flows into conduit 25. The lower opening of conduit 25 is at or below a lower surface 24a of bottom tray 24 and provides a fluid path from below the bottom tray 24 and upper surface 31b of top tray 31 and the upper section 27 of column 8. At the upper end of conduit 25 is preferably a cap 26 that functions to prevent carryover of liquid into the excess off-gas 12. Preferably, upper section 27 of column 8 is maintained as a nonexplosive environment by introducing a gas 10, for example fuel gas, inert gas or mixture of such gases. Excess gas is removed as an off-gas 12 and is typically sent for disposal, for example, by incineration.

The liquid mix of disulfide oil and caustic exiting conduit 25 onto the upper surface 31b of top tray 31 is directed to an opening in in the top tray an into a shroud 30 connected to the lower surface 31a of the top tray. Within shroud 30 is a plurality or bundle of vertical hanging fibers 45 that are generally aligned, i.e., generally parallel, with longitudinal axis 8a of column 8. The bundle of vertical hanging fibers provides a large surface area to allow the reactants to contact and to eventually separate the resultant immiscible liquids formed.

Preferably, the vertical hanging fibers comprise long thin filaments or ribbons made of materials selected from a group consisting of, but not limited to, metal fibers, glass fibers, polymer fibers, graphite fibers and carbon fibers that meet two criteria: (1) the fiber material must be preferentially wetted by the admixture of at least two immiscible liquids; and (2) the fibers must be of a material that will not contaminate the process or be destroyed by it, such as by corrosion. Further, must allow mass transfer and separation in a non-dispersive manner.

The lower end or bottom of the shroud 30 terminates in a separation zone 52 that is defined between a liquid hydrocarbon top surface 79, i.e. a mix of DSO and solvent, and the lower surface 31a of the top tray 31. Optionally, a second stream of oxidant 80 can be injected or otherwise mixed with the liquid mix of disulfide oil and caustic as it enters the top of shroud 30. The liquid mix of disulfide oil and caustic contacts a bundle of vertical hanging fibers such that the liquid mix of disulfide oil and caustic flows down individual fibers in the bundle composing a second reaction zone.

The second reaction zone contained inside the shroud 30 is maintained as a gas continuous phase comprising from about 20% to about 100% by volume vapor. The excess of oxidant in this vapor continuous phase provides excellent mass transport conditions for the oxidation of remaining mercaptans. Because the flow of gas and liquid are co-current, there is no restriction on flow rate due to flooding. The opening of the shroud must be located above the liquid hydrocarbon phase 51. The remaining mercaptans in the caustic are oxidized and converted to DSO in the second reaction zone. The upper surface 24b of bottom tray 24 collects the liquid mix in the separation zone 52. The collection of the liquid mix is allowed to separate into a hydrocarbon upper layer 51 and a lower aqueous layer 50. The upper hydrocarbon layer 51 comprises DSO and/or solvent, and the lower aqueous layer 50 comprises the liquid catalyst and the oxidized, substantially sulfur free, lean/regenerated caustic solution. The upper layer 51 and lower layer 50 are removed from column 8 via lines 11 and 14, respectively, at variable flow rates in order to maintain a residence time sufficient to achieve separation of the two layers defined by boundary interface 72. The removed DSO and solvent in the upper layer is sent to storage or for further processing. The removed caustic and catalyst from the lower layer is preferably sent to a solvent wash step 15 (see FIG. 1). Any excess gas in the separation zone 52 is removed via line 40.

In a further embodiment of my invention, the shroud that comprises the second reaction zone may further comprise two zones; an upper contact zone and an enhanced coalescing zone (ECZ). The ECZ is located at the bottom of the shroud and is defined by a disengagement device configured to allow a portion of the admixture of liquids within the shroud to flow radially outward to exit the shroud through the one or more openings following a flow path that is not parallel to the vertical axis to contact a coalescing surface associated with the disengagement device. The upper contact zone is defined by the upper portion of the shroud. Within the upper contact zone of the shroud the admixture of liquids fed to the vertical hanging fibers is contained within the shroud and contacts the fibers as the liquids flow downward parallel to the vertical axis of column 8. The walls of the shroud in the upper and lower contact zones are solid (i.e., contain no openings) and can take the form of a tube-like or conduit like structure that can be round, oval, square, rectangular or any shape that ensures contact of the hanging fibers with the admixture of liquids. The actual cross-sectional shape of the shroud is not important to the invention and the shroud may or may not have the same diameter or shape as the disengagement device. Because the upper contact zone of the shroud has no openings in the wall, the admixture of liquids must flow downward, parallel to the vertical axis.

The disengagement device can be an extension of the bottom section of the shroud and defines the ECZ. The hanging fibers are positioned vertically within the shroud and within the disengagement device hanging generally parallel to the vertical axis of the column. The fibers within the disengagement device can be a separate independent bundle or an extension of the fiber bundle that is contained within the upper contact zone.

In the ECZ, a portion of the admixture of liquids exits the disengagement device following a radial flow path that is not parallel to the vertical axis defined by the hanging fibers. As the portion of the admixture of liquids exits the disengagement device, a portion of one of the immiscible liquids coalesces to form a coalesced liquid. Depending on the properties of the coalesced liquid, droplets, rivulets or small steams are formed that fall downward on the outside of the disengagement device and parallel to the vertical axis. The coalesced liquid, if it was originally a portion of the higher density liquid, will flow downward and will settle into the lower phase layer at the bottom of the vessel interior.

The disengagement device can be a separate structure connected to the shroud or an extension of the shroud provided that it allows the admixture of liquids to exit both radially through one or more openings and through an open end parallel to the vertical axis as opposed to the radial flow path that is not parallel to the vertical axis. The open end of the disengagement device prevents pressure drop problems associated with prior art attempts to eliminate or reduce dispersions caused by low interfacial tension systems. A preferred disengagement device comprises a vertical segment connected to the bottom of the shroud at the end of the lower contact zone and having one or more side openings or holes that allow non-parallel flow of a portion of the admixture of liquids. The disengagement device can be a perforated extension of the shroud at the bottom of the lower contact zone, preferably in the form an annulus or alternatively, it can be a wire screen or other cage-like support structure. Most preferably, the disengagement device has associated therewith a coalescing surface configured to contact the portion of the admixture of liquids that exits radially from the disengagement device following a flow path that is roughly perpendicular or at approximately a right angle relative to the vertical axis.

The coalescing surface is selected from the group consisting of wire grid, porous metal wall, open-celled sponge, woven wire screen, knitted wire mesh, woven or non-woven fibrous material of metal, polymer resins or combinations of metal and polymer resins, multiple co-woven filaments, packing, fiber filters, and combinations of media layer on each other. Materials used to fabricate the coalescing surface include, stainless steels, Duplex steels, alloys, plastics, fluoropolymers, fibrous components (polyolefin, polyesters, glass fibers, and like materials), and mixtures of same. The coalescing surface is most advantageously configured to interact with one of the liquids in the admixture and to form small droplets. These droplets then grow in size to larger droplets of the heavier phase that can then be easily settled out from the lighter liquid by gravity. The volumetric void fraction of the coalescing surface should be less than 98% and most preferably less than or equal to 96%.

Wire mesh coalescing surfaces can comprise a combination of wires and fibers in order to create a maximum surface area for droplets to coalesce. In many cases the wire and fiber are from a different construction material, where one is hydrophilic (e.g. metal) and the other is hydrophobic (for example, polyolefin or fluoropolymer) which enhances the separation. There is an increased coalescence effect at the junction point between both materials. Therefore, using both the metal and polymeric materials will increase coalescing efficiency significantly. The coalescence surface of our invention can take the form of a physical wrapping around, or positioned adjacent to, slots, holes, perforations, or other openings in the disengagement device. This wrapped coalescence surface is held in place by bands, ties, clamps or other fasteners attached to the external surface of the disengagement device provided that the exiting admixture of liquids is forced to contact the coalescing surface.

Most preferably, the coalescence surface is incorporated in an annulus or ring that forms part of the vertical length of the disengagement device and defines the enhanced coalescing zone (ECZ). On the inner ring or wall of the annulus are a plurality of holes that allow the admixture of liquids to pass into the inside of annulus where the admixture contacts the coalescing surface that is positioned or packed into the annulus. The outer ring or wall of the annulus likewise has a plurality of holes, slots, perforations, screen or grid openings or other such openings to allow the admixture to pass to the outside of the disengagement device. The type of openings used in the outer wall may or may not be the same as that used on the inner wall. Regardless of whether the coalescing surface is located in an annulus or wrapped around a perforated structure in the disengagement device, the volumetric void fraction of the coalescing surface is preferably in the range of from about 90% to about 99%, more preferably from about 95% to 98%. The coalescing surface should preferably occupy a volume that is sufficient to eliminate dispersion and form a coalesced liquid as either droplets or a continuous liquid stream. The amount of coalescing surface can be varied to increase or decrease the holdup or residence time necessary to form the coalesced liquid. A preferred coalescing material is a co-woven type material comprised of 316 stainless steel and polytetrafluoroethylene (Teflon) fiber filaments, with very fine fiber size and having an installed density of around 15 to 30 lb/ft$^3$.

Figure 4:
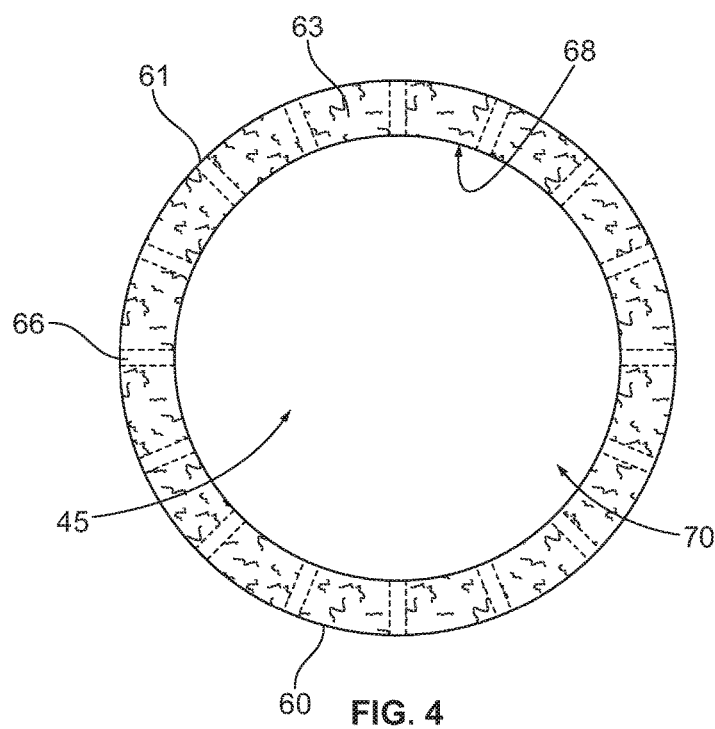
FIG. 4 is a schematic representation of a cross-section portion of the disengagement device illustrated in FIG. 3.
Figure 3:
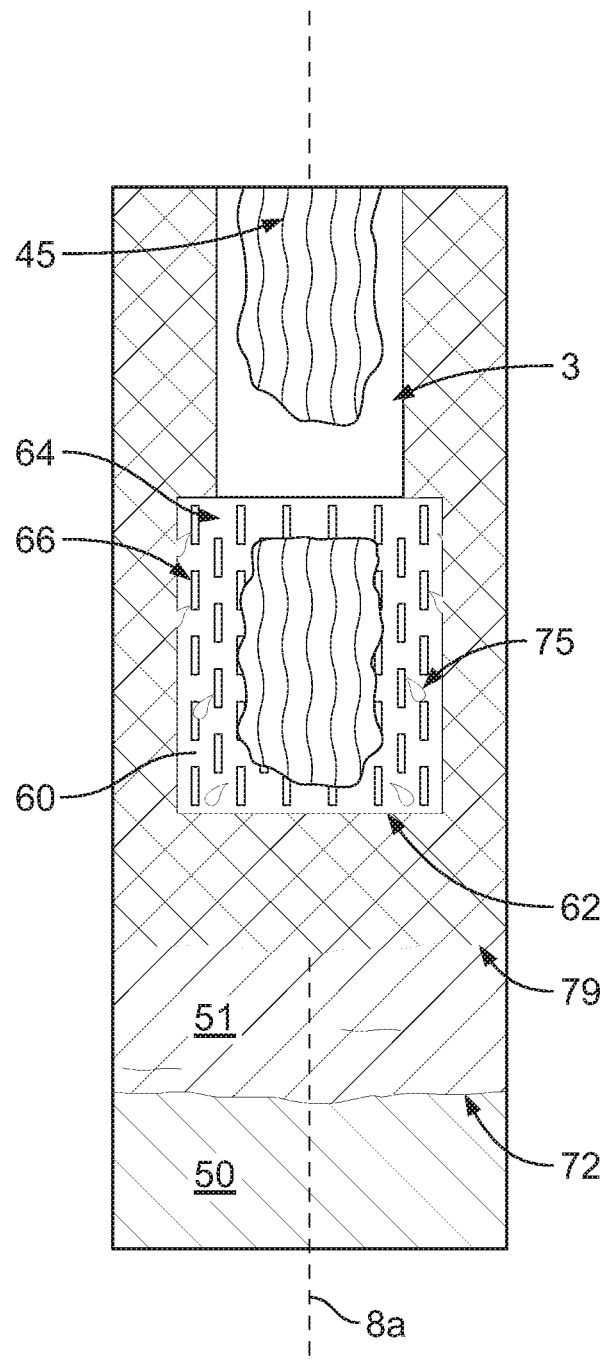
FIG. 3 is a schematic representation of one possible design of the disengagement device connected to a shroud and defining a coalescing zone.

FIG. 3 illustrates one possible embodiment of the disengagement device 60 that is shown as an addition to the bottom of shroud 30. Like reference numbers have the same meaning as previously described. The disengagement device 60 defines an enhanced coalescing zone (ECZ) and has an open end 62. In the particular embodiment shown in FIG. 3, the disengagement device 60 comprises an annulus 64, which becomes an extension of shroud 30 and provides side openings 66 to allow radial flow of the admixture of liquids to exit the disengagement device in flow path that is not parallel to axis 8a. A cross-section of this annulus 64 is illustrated in FIG. 4 showing the bundle of hanging fibers 45 being contained within the inner wall 68 that forms an interior volume 70.

Both the inner wall 68 and outer wall 60 of the annulus 64 contain one or more side openings 66. Inside the annulus is located the coalescing surface 63. The preferred coalescing surface has a volumetric void fraction in the range of from about 90% to about 99%, more preferably from about 95% to 98%. A preferred coalescing material is a co-woven type material comprised of 316 stainless steel and polytetrafluoroethylene (Teflon) fiber filaments, with very fine fiber size and having an installed density of about 15 to about 30 lb/ft$^3$. The amount of coalescing material added to annulus, or in the cases of a wrapped configuration, is sufficient such that there is enough residence or hold up time of the liquids in the material to cause the liquid to coalesce. The plurality of openings 66 allow a portion of the admixture of liquids to flow through the annulus in a radial flow path that is non-parallel to the vertical axis 8a. Preferably, the one or more openings 66 represent at least a 50% open area in the walls of the annulus. These openings can be slots, holes, punctures, or perforations of any shape or dimension.

As the admixture passes through the annulus 64 it contacts the coalescing surface 63 whereby any dispersion in the admixture is collapsed to form droplets 75 (see FIG. 2). These droplets 75 continue to grow until they either fall through the coalescing material or re-enter the fiber bundle or exit through the openings 66 in the outer wall 60. In other words, the formation and growing of the droplets 75 is the coalescing of one of the liquids in the admixture, typically the denser liquid. When the droplets are of the denser liquid, they grow and fall, dropping downward to become part of the lower liquid in layer 50. Because little or none of the dispersion survives the coalescing surface 63, a distinct phase interface 72 is formed between the higher density liquid in layer 50 and the lower density layer 51. This eliminates carry over of the higher density liquid and allows for precise control of interface level 72, which avoids pump cavitation and the contamination of the lighter liquid in process line 11.

While temperature and pressure in the second reaction zone may range from about 75° F. to about 200° F. and from 0 psig to about 500 psig, preferably both reaction zones are maintained at a temperature in the range of about 100° F. to about 150° F. and a pressure in the range of about 0 psig to about 100 psig.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

The invention claimed is:

1. A method of oxidizing mercaptans to disulfide oil comprising:
   providing a liquid stream containing mercaptans and a catalyst to a top portion of a column containing a bundle of vertical hanging fibers;
   mixing an oxygen containing gas in a first reaction zone with the liquid stream to form an admixture prior to contacting the admixture in an upper section of the top portion with the vertical hanging fibers;
   directing the admixture to flow down the fibers and to enter a gas continuous phase reaction zone comprising from about 20% to about 100% by volume vapor;
   oxidizing the mercaptans to disulfide oil as the admixture flows down the fibers in the reaction zone;
   removing an off gas stream from the upper section; and
   collecting, separating and removing the disulfide oil from the column.

2. The method of claim 1 wherein the gas liquid mix flowing into the first reaction zone contacts supported packing material.

3. The method of claim 1 where the catalyst is formed by mixing water, alkali metal hydroxide, and a chelated polyvalent metal catalyst.

4. The method of claim 3 wherein the chelated polyvalent metal catalyst is selected from the group consisting of cobalt phthalocyanine, iron phthalocyanine, vanadium phthalocyanine, and mixtures thereof.

5. The method of claim 1 wherein the oxygen containing gas is injected to achieve an oxygen concentration that is approximately equal to or exceeds the stoichiometric requirement for full oxidation of mercaptans into disulfide oil.

6. The method of claim 1 wherein an interior portion of the upper section of the column above the top tray is maintained as a nonexplosive environment.

7. The method of claim 6 where fuel gas or inert gas is introduced into the interior portion of the upper section.

8. The method of claim 1 where an off gas stream is removed from a second reaction zone located within the shroud.

* * * * *